United States Patent
Gunther

(10) Patent No.: US 6,380,954 B1
(45) Date of Patent: Apr. 30, 2002

(54) METHOD AND SYSTEM FOR LAYOUT OF OBJECTS WITHIN A PERIMETER USING CONSTRAINED INTERACTIVE SEARCH

(75) Inventor: Carl Edward Gunther, West Hollywood, CA (US)

(73) Assignee: Reuters, Ltd. (GB)

( * ) Notice: Subject to any disclaimer, the term of this patent is extended or adjusted under 35 U.S.C. 154(b) by 0 days.

(21) Appl. No.: 09/246,989

(22) Filed: Feb. 8, 1999

Related U.S. Application Data

(60) Provisional application No. 60/074,144, filed on Feb. 9, 1998.

(51) Int. Cl.$^7$ ................................................. G06F 3/00
(52) U.S. Cl. ..................... 345/764; 345/853; 345/781
(58) Field of Search ................................ 345/342, 356, 345/340, 339, 333, 334, 346, 788, 853, 781, 764, 762, 804; 705/35, 36, 37

(56) References Cited

U.S. PATENT DOCUMENTS

| | | | | |
|---|---|---|---|---|
| 5,669,006 A | | 9/1997 | Joskowicz et al. ........... | 395/779 |
| 5,734,380 A | * | 3/1998 | Adams et al. ............... | 345/340 |
| 5,812,128 A | * | 9/1998 | Sterling, VI ................. | 345/334 |
| 5,815,712 A | * | 9/1998 | Bristor et al. .................. | 717/1 |
| 5,911,145 A | * | 6/1999 | Arora et al. ................. | 707/514 |
| 6,108,696 A | * | 8/2000 | Mendhekar et al. ......... | 709/217 |

FOREIGN PATENT DOCUMENTS

| | | | | |
|---|---|---|---|---|
| EP | 0622728 | 11/1994 | ............. | G06F/9/44 |
| EP | 0689134 | 12/1995 | ............. | G06F/9/44 |

OTHER PUBLICATIONS

Hudson et al., "A Synergistic Approach to Specifying Simple Number Independent Layouts By Example," Bridges Between Worlds, pp. 285–292 (1993).

Nakamura et al., "Surface–Based Geometric Modeling of General Objects Using Teaching Trees," IEEE/RSJ International Conference on Intelligent Robots and Systems, vol. 2, pp. 341–347 (1995).

* cited by examiner

*Primary Examiner*—Ba Huynh
*Assistant Examiner*—Kiev D. Vu
(74) *Attorney, Agent, or Firm*—Banner & Witcoff, Ltd.

(57) ABSTRACT

A computer-based method and system for guiding a user through the process of positioning a set of graphical components within a container in a manner that guarantees that a satisfactory layout will be obtained if such a layout is possible, no matter what placements are selected by the user. This method and system provide an interactive and automated page layout that is generated without trial and error on the part of the user, while allowing the user to exercise choice when such choice is not in conflict with the goal of obtaining a satisfactory layout, where a satisfactory layout is defined as one for which i) no components overlap, ii) the entire area available within the container is occupied by the components, iii) the constraints on size associated with each individual component are satisfied, and iv) the non-constraining preferences regarding size and location that are associated with each component are respected whenever they are not in conflict with user choices and component constraints.

20 Claims, 13 Drawing Sheets

METHOD AND SYSTEM FOR LAYOUT OF OBJECTS WITHIN A PERIMETER USING CONSTRAINED INTERACTIVE SEARCH

RELATED APPLICATIONS

This application claims the benefit of provisional application Ser. No. 60/074,144, filed Feb. 9, 1998, pending.

BACKGROUND OF THE INVENTION

1. Field of Invention

The invention generally concerns a computer-based layout of objects within a perimeter (viewing area) in a user interactive manner. In particular, the invention relates to a method of implementation for user interfaces which support concurrent execution of a plurality of application programs ("objects") in a container application using a page layout display defined by a user for simultaneous viewing of these applications.

2. Discussion of the Prior Art

Search algorithms have been used in the past for layout tasks, such as the positioning of articles and advertisements on the pages of a newspaper or magazine. These prior programs start from a fixed set of search criteria and proceed autonomously to a solution (a satisfactory layout) that satisfies these criteria. In cases for which these criteria are discovered during the search of the program to be unsatisfiable, users are required to respecify their search criteria and start the planning process again, in the hope that their changes will enable a solution (a satisfactory layout) to be found. Conversely, when the number of possible layouts is very large, users may be confronted with a vast set of alternative possibilities from which to choose. Furthermore, the exhaustive generation of all possibilities may be so time-consuming as to render the process impractical without automated "pruning" (elimination of search paths) of the search tree. Such automated pruning usually results in the elimination of many potentially desirable layouts.

The dilemma presented is that selecting search criteria that are too specific results in repeated failures to obtain a satisfactory layout, while choosing search criteria in too general a manner results in a very large number of possible solutions. The former case causes inefficiency and frustration, while the latter case results in a large set of layouts that are difficult to compare, and within which specific desired positions for particular components are difficult to find.

When setting up search criteria for such a program, users are generally not aware of how the choice of a position for a particular component will affect the possible positional choices for the other components to be placed. If the consequences of such relative constraints could be made clear in an incremental manner while the user is specifying the desired positions of components, then the process of searching for and choosing a page layout could become a completely linear and deterministic one for the user.

Many real-time information data display applications comprise a container that supports simultaneous execution of several service applications (child objects) concurrently in a predefined page layout scheme without allowing a user the capability of defining content and how the page layout appears. This problem induces user inefficiency since much of the information displayed is distracting and unnecessary to the user. For example, U.S. Pat. No. 5,838,321 illustrates a user interface that displays child objects in a container application using predefined page layout protocols without automation support for a user defined page layout capability.

An example of this problem occurs with financial service information applications, where financial market quote data and other objects are concurrently displayed on one page wherein the content and layout cannot be modified. These data objects can be any combination of objects that appear simultaneously on the display. These objects include, but are not necessarily limited to, real-time quotes, tickers, charts, monitor lists, time and sales, dynamically updating market data displays covering equities, mutual funds, options, listed bonds, treasuries and futures. This information is typically displayed by initial configuration of the application display output by the container application in predefined areas in the display which cannot be customized by a user.

Thus, there is a need for a user defined page layout capability allowing any combination of service application objects in a container to be concurrently displayed on a screen or other system that outputs graphical/text information. In particular, the financial services industry needs such a capability for custom placement of financial service application objects for effective decision making purposes. The present invention addresses these problems.

SUMMARY OF THE INVENTION

The primary advantage of the present invention is to provide a user-interactive and computer-based page layout method for multiple objects that is user defined. An exemplary use of the invention is for the display of multiple service applications (child objects) in a container that are concurrently displayed on a single screen. The method allows user flexibility in how the page layout appears by efficiently and automatically sizing objects that appear on the page by using a search method.

Further advantages of the invention include enablement of the arrangement of a selected set of graphical components (for example, service object applications) within a window (for example, a container application in a user interface) in a manner that: a) allows users to interactively exercise choice in the positioning of components; b) ensures that no components overlap; c) ensures that all available space within the container is occupied by components; d) ensures that a set of dimensional constraints associated with each component is satisfied; and e) ensures that a set of positional preferences associated with each component is considered.

This invention provides a method that guides a user through the process of positioning a set of graphical displayed output component objects within a container such that satisfactory page layouts occur if such a desired page layout is possible, regardless of what placements are selected by the user. The method provides an interactive and automated page layout that is generated without trial and error on the part of the user, while allowing the user to exercise choice when such choice is not in conflict with the goal of obtaining a satisfactory layout. The criteria defining such a satisfactory page layout are: a) no components overlap; b) the entire area available within the container is occupied by the components; c) the constraints on size associated with each individual component are satisfied; and d) the non-constraining preferences regarding size and location that are associated with each component are respected whenever they are not in conflict with user choices and the component object size constraints.

The invention is practiced in an interactive computer system having a keyboard, mouse or other user specified input device, a display, and an icon/menu driven graphical user interface capable of initiating execution of one or more object applications and capable of confining the display of these object applications provided during execution in the output display of the container application. The invention is preferably used with a container application that has multiple active objects and includes object editing tools to define a page layout of the service applications that are concurrently shown on a display screen. The page layout method provides a convenient way to create and format document pages containing a selection of child objects viewable on a screen. The page layout is defined through the user's interaction with the method defined herein. This method is preferably included in an object editor of a container application for the display of multiple service application objects. The page layout method provides adaptive definition of the page layout of several object applications.

BRIEF DESCRIPTION OF THE DRAWING

The foregoing and other objects, aspects, and advantages of the invention will be better understood from the following detailed description of the preferred embodiment of the invention with reference to the drawing, in which.

DETAILED DESCRIPTION OF THE PREFERRED EMBODIMENTS

Figure 1:
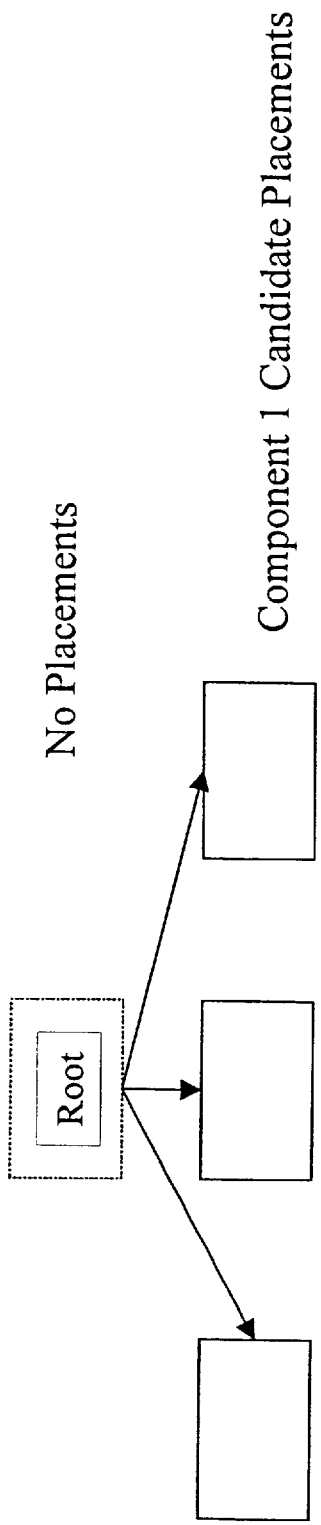
FIG. 1 shows a graphical representation of the state of a search process in which three components are to be placed within a container using the invention, near the beginning of the process, where three unvalidated candidate placements for the first component to be placed have been generated.

The terminology of "component" is defined as an object to be placed within a "container" that encompasses the window of viewing of a document. Viewing is preferably on a screen display in the best mode of carrying out the invention. "Objects" are preferably defined as applications that appear in the container and typically are ActiveX object applications when using operating systems sold by Microsoft, Inc.

The method of page layout of the invention builds upon the basic techniques of breadth-first and depth-first search. Both of these techniques use an upside-down "tree," called a "search tree" (as shown in FIGS. 1–5) in which the root represents the state where no placements have been associated with components, the first set of branches below the root represents placements for the first component in the list of components to be placed, the second level of branches (spreading from the tips of the first level branches) represents placements for the second component to be placed, etc. The terminal, or "leaf" nodes (tips of branches) in the tree represent states for which either all components have been placed or no farther components can be placed without violating constraints. Breadth-first search generates all candidate placements at a given level (that is, for a given component) before descending to explore (make trial placements for) the next level (that is, the one for the next component to be placed). Depth-first search generates and explores a single candidate placement of a component for a given level (where a level is a set of alternative placements for a particular component) at a time, plunging down toward the deepest levels of the "search tree" until either a solution (a complete layout) is found or no additional components can be placed (at which point it "backs up" to a prior level, makes a prior choice differently, and continues exploring downward from that point).

In the search method, the object of the search process is to arrive at a placement for each component that satisfies the definition of a satisfactory layout. The method of the invention provides for a satisfactory page layout satisfying the criteria that a) no components overlap, b) the entire area available within the container is occupied by the components, c) the constraints on size associated with each individual component are satisfied and d) the non-constraining preferences regarding size and location that are associated with each component are respected whenever they are not in conflict with user choices and the component object size constraints of item c), above.

This method uses a breadth-first expansion search to generate a list of candidate placements for a given level. It then uses a depth-first search starting from each candidate to determine which of these candidates is guaranteed to lead to a satisfactory layout (that is, a candidate placement for which it is certain that some set of choices for subsequent components can be made that results in a satisfactory layout). This depth-first search is halted the moment any single satisfactory layout has been found (since this proves that the choice is a usable one). Candidates that can never result in a valid layout, no matter what the subsequent component placements, are eliminated from consideration. The user is then allowed to select one candidate from among the remaining validated candidates. Because of the validating depth-first search, all validated placement candidates are guaranteed to lead to at least one layout for which all components are legally placed. This prevents the user from making a choice that could never result in a satisfactory layout, while allowing virtually all other meaningfully distinct choices to be made.

Starting from the most specific user-confirmed "node" (search state) of the search tree (initially, the root), the search process generates a fairly extensive set of candidate positions for the placement of the next (initially, the first) component. This constitutes a breadth-first expansion of the current "search state" (set of placements for preceding components) to a depth of only one level below the current one in the search tree (that is, the level representing the choice of the next component).

Figure 6:
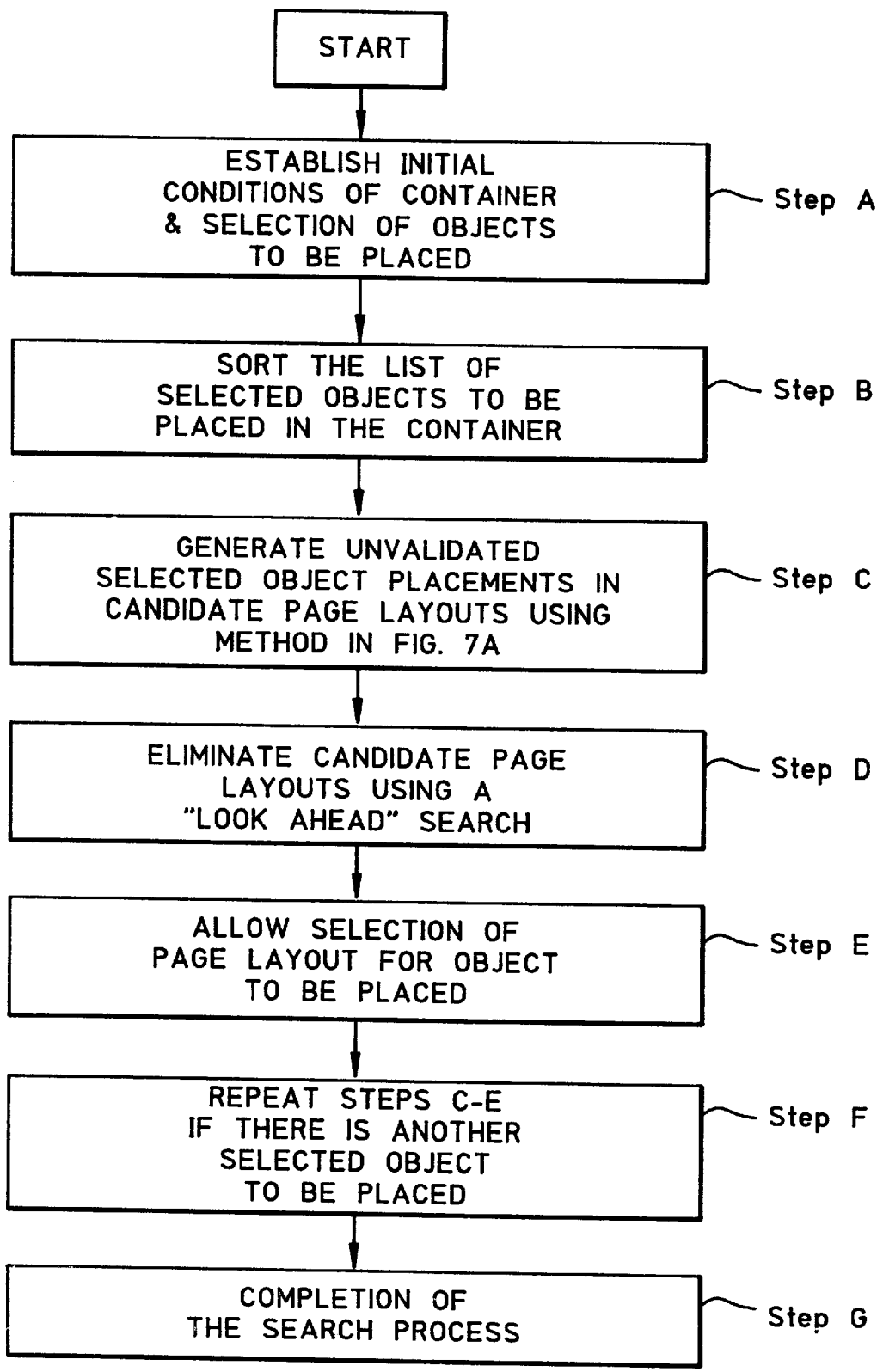
FIG. 6 is a flow diagram illustrating the principles of the search process of the invention.

Following this expansion, a depth-first search is performed from each of these initial candidate placements to see if the remaining components can all be placed on the remaining open areas of the container in a manner that is consistent with their declared minimum sizes and which also occupies all of the space in the container without allowing gaps to appear. As soon as any valid solution is found for a search originating from a given candidate position, the validating search for that position terminates and the position is considered to be validated. Any candidate that does not lead to a valid configuration is eliminated. At this point, the user is asked to choose one of the remaining, validated candidates, which means that the user will see only candidate choices for the placement of the next component that lead to a satisfactory layout. Once the user makes a commitment to one of the validated choices, the process (of breadth-first candidate generation and depth-first candidate validation) repeats for only those branches at the next level of the tree that emanate from (thus, represent placements that are consistent with) the user-selected placement. FIG. 6 illustrates the concepts presented above for page layout of a display window in which multiple selected objects are to be placed within the perimeter of a container. The steps for implementing the invention are described below in steps A–G.

Page Layout Search Process

Referring to FIG. 6, the steps A–G include:

Step A. Initial Conditions. The parameters are established by a user for the desired page layout configuration. The user selects a set of components (application objects, for example, ActiveX objects) to be sized and positioned within a container. Associated with each component is a set of alternative minimum sizes (minimum width/minimum height pairs) and preferred positions (near to top, near to bottom, near to left, near to right, near to top-left, near to top-right, near to bottom-left, near to bottom-right). The objects are rectangles.

Step B. Sorting the Components. The combination of a size and a position, when applied to a component, is known as a placement. Components which have been associated with a size and a position are said to have been placed. The set of components to be placed is sorted into a particular order. The criteria for sorting can vary depending upon the specific implementation, but once the order has been generated it remains fixed throughout the layout process.

Step C. Generating Unvalidated Candidate Placements for the Next Component Object to be Placed. Candidate placements are generated for the next (initially, the first) component in the sorted order. This is done using a routine described below in "Generation of Candidate Placements of the Components." This routine prevents components from overlapping and respects the size constraints of the individual component objects. FIG. 1 shows a graphical representation of a hypothetical search using the invention, wherein a Component 1 object is to be placed and unvalidated page layout candidate placements are generated using a breadth-first expansion search. This stage of the search process reflects that three component objects are to be laid out on the page. The root "search node" represents (holds) this initial selection of the objects to be placed in the page layout. The page layout search begins with Component 1 object. The "search process," as discussed below, generates an initial breadth first expansion of the possible placements for Component 1 that consists of three proposed placements.

Step D. Eliminating Component Candidates Through a Validating "Look Ahead" Search. An automated depth-first search is performed starting from each candidate Component 1 placement as shown in FIG. 1 to determine whether, given that placement, it will be possible to place each of the remaining components in some manner without causing components to overlap and without leaving gaps or violating constraints upon component size. This search process uses the same candidate generation process, as discussed below, to place successive Components 2 and 3 on a trial basis. Where constraints on placement and size prevent the placement of the remaining components, this results in a "dead end" (candidate page layouts where an "X" appears in the search node, showing that no further object placements can be made starting from them without causing either overlapped components or violated constraints). The page layout method does a "back-up" to undo these invalidated candidate object placement choices. Then, the "search process" begins again at a prior (higher level) search node, generating alternative candidate object placement choices at this higher level, and continuing its search with a new trial placement.

Figure 2:
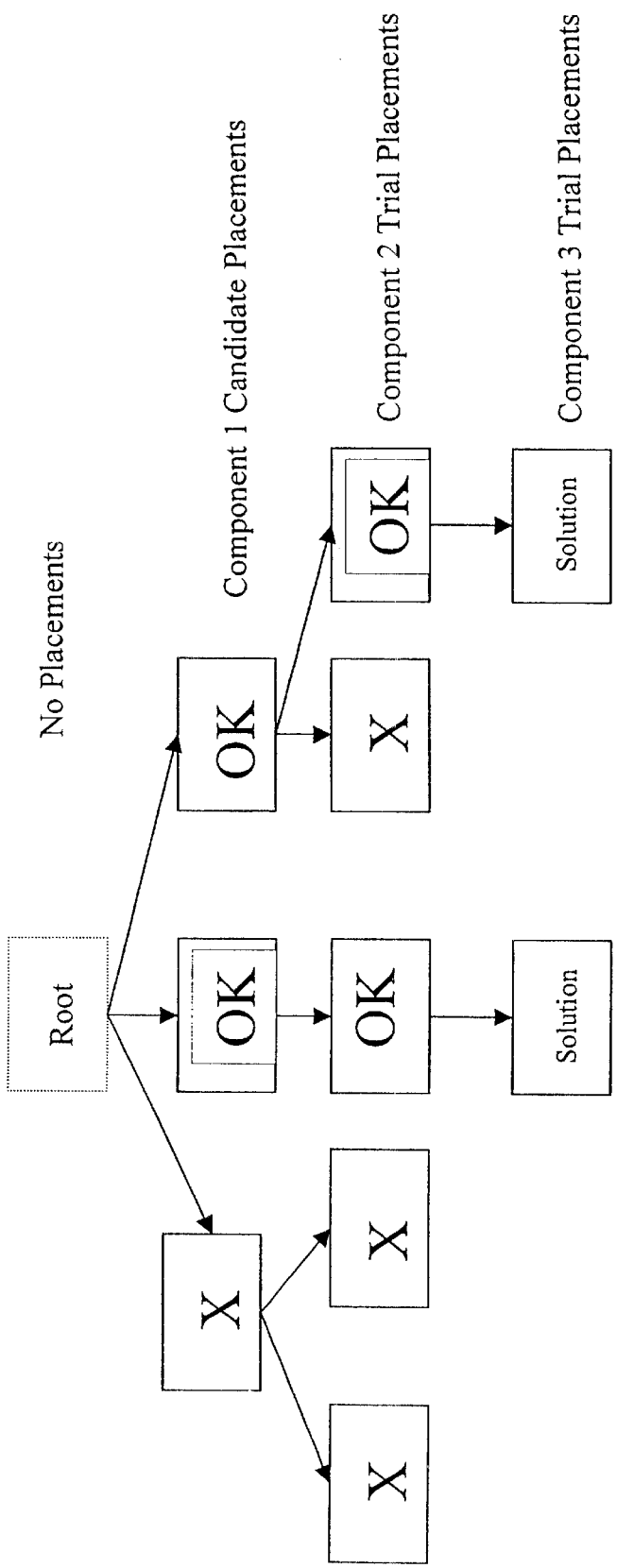
FIG. 2 shows a graphical representation of the state of this same search process in its next phase, which uses the "look ahead" search aspect to remove an initial component from a set of selected components.
Figure 3:
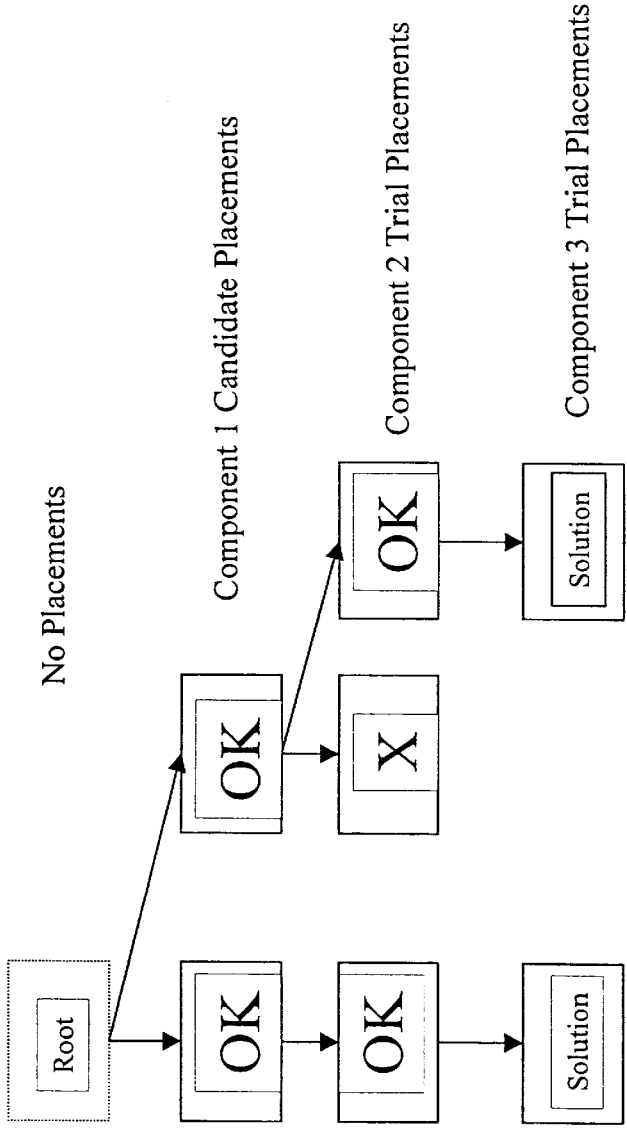
FIG. 3 shows a graphical representation of the state of this same search process, wherein invalid candidate placements are removed.

FIG. 2 shows this continuation of the page layout process with a validating "look ahead" search using a depth-first validation of component 1 placement starting from each of the three unvalidated components. "OK" in a candidate node (box) indicates that the associated placement for the component object associated with the level of that node is permissible. "Solution" in the bottom row of page layout candidate windows marks viable candidate page layouts for the three components collectively. If "dead end" search nodes (boxes with "X") occur on all search paths from a particular page layout placement candidate, then that layout candidate is eliminated from consideration. Conversely, the page layout candidates leading to at least one viable placement of all selected component objects remain in the set of page layout candidates. FIG. 3 shows the continuation of the page layout search process, wherein non-validated Component 1 candidate page layout placements are removed. As shown, there are two remaining page layout candidates that the user can select from.

Step E. Manual Candidate Selection. Referring to FIG. 3, each remaining candidate placement is "guaranteed" (by the preceding "look ahead" search process) to lead to at least one valid page layout. These candidate placements are sorted in an order reflecting some measure of their desirability (this is usually based upon their closeness to one of the minimum sizes for the component object, and the degree to which they satisfy the positional preferences for that component object). As shown, the user selects a validated Component 1 placement.

Figure 4:
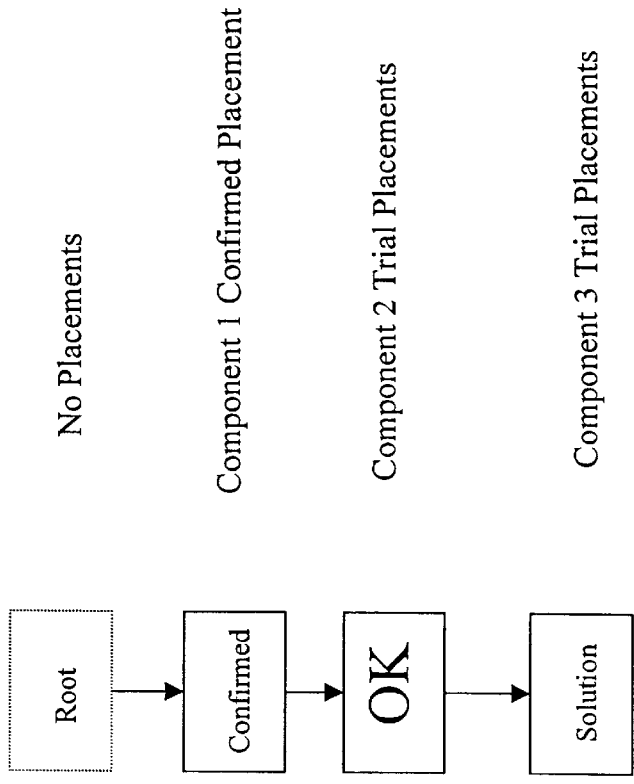
FIG. 4 shows a graphical representation of the state of this same search process wherein the user selects a validated positioning for the initial component from the choices of FIG. 3.

The first of these viable candidates is presented to the user typically by a graphical screen display that shows the proposed candidate displayed graphically on the screen (along with rectangles that show the positions of components already placed and confirmed by the user). The selected component objects are typically shown as rectangles that appear within a larger rectangle representing the container object. Using a scrollbar within a graphical user interface as discussed below in the "Method of Use," a user can substitute other validated placements of the candidate object for the one originally shown to see how they appear on the simulated page. When one of these page layout placement candidates is satisfactory to the user, the user can select it. FIG. 4 shows this stage of the page layout process, wherein one of the two viable candidate solutions is selected by the user as the desired placement of Component 1 in the page layout being created by the user's interaction with the system.

Step F. Repeating Steps C–E. If the most recently placed component object is not the last component object to be placed in the page layout, then the page layout process reiterates Step C (Generating Unvalidated Candidate Placements) through Step E, starting from the placement (search node) most recently confirmed (selected) by the user until the last selected component is satisfactorily placed on the page layout and validated by the user.

Figure 5:
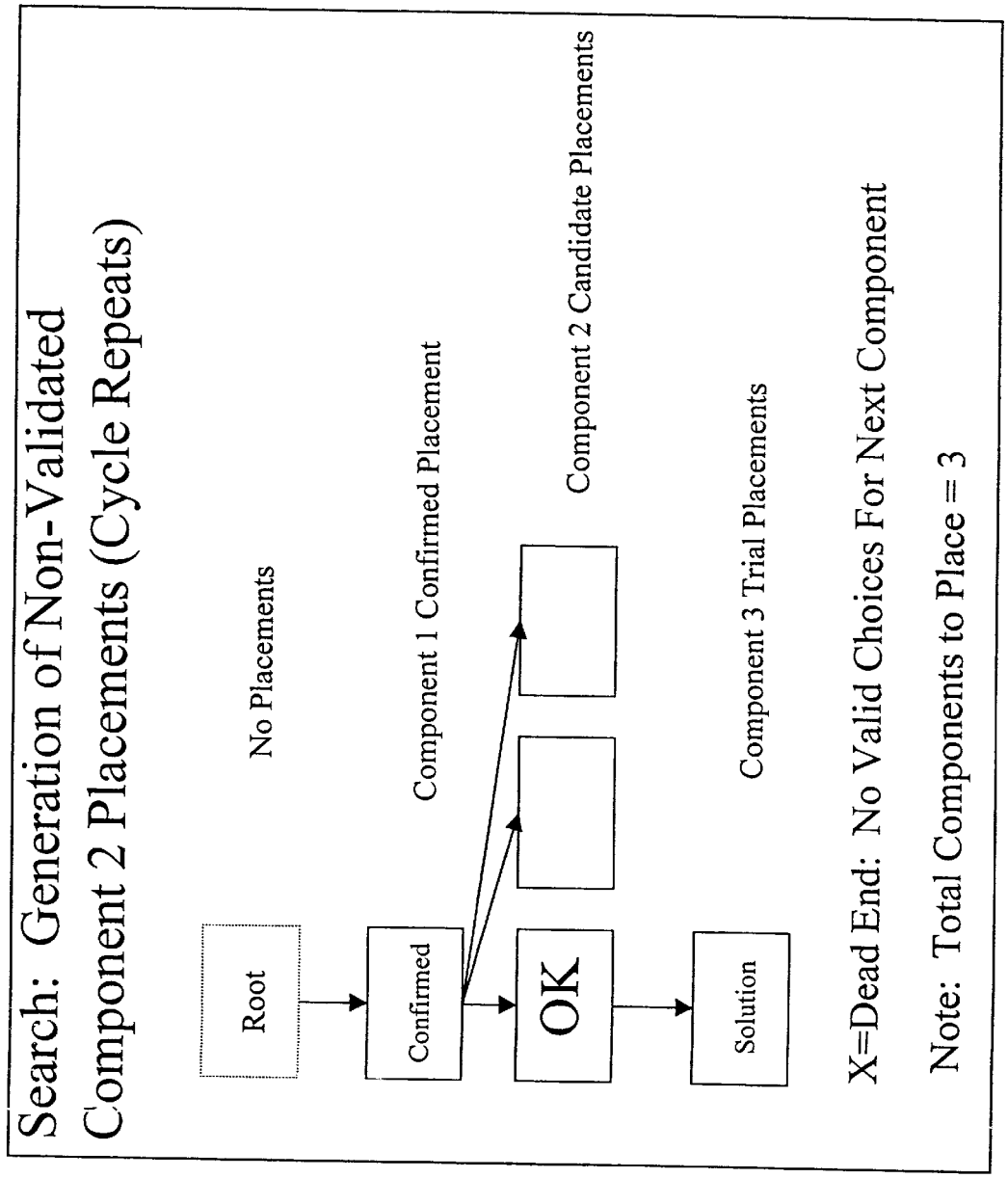
FIG. 5 shows a graphical representation of the state of this same search process wherein the search process is repeated for the second component.

FIG. 5 shows the page layout process after non-validated candidate generation has occurred for the next component to be placed (component 2). The page layout box at the level of Component 1 marked "confirmed" indicates that the corresponding candidate placement for Component 1 has been selected by the user. The "search process" continues with a breadth-first expansion of the user's selected candidate node. The process continues forward from this point through steps C–E, repeating these steps until a selection has been made by the user for each selected component to be placed.

Step G. Completion. If the user-selected component object is the last one in the list to be placed, a complete page layout has been generated and the page layout process ends with a finished page layout displayed. The user can assign a control execution object (part of the graphical user interface controls) to this page layout for subsequent execution of this designated page layout.

Generation of Candidate Placements of the Selected Objects

Figure 7A:
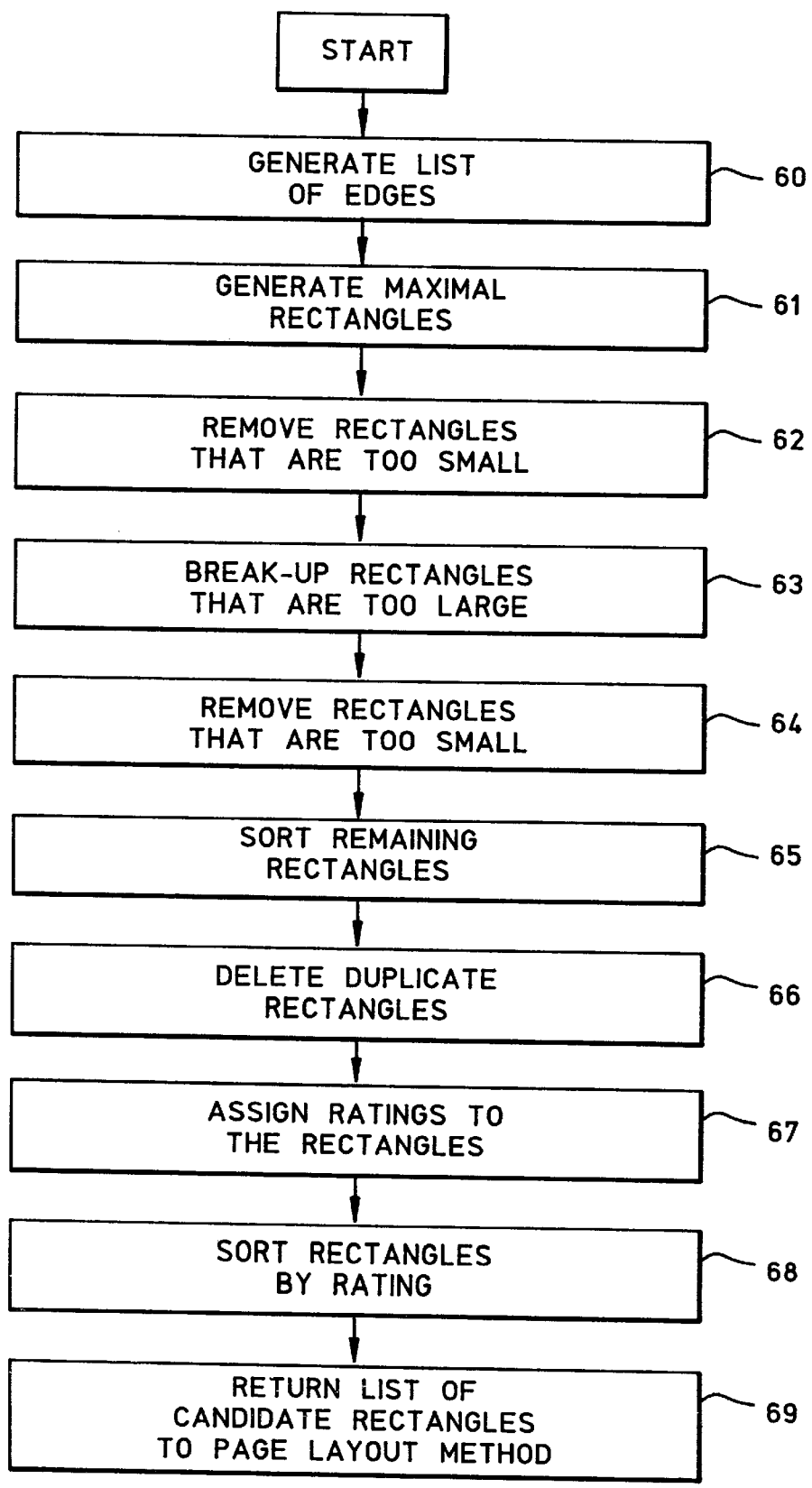
FIG. 7A is a flow diagram illustrating the principles of the candidate component placement generator of the invention.

Referring to FIG. 7A, a flow diagram in block form shows the process for generating the candidate placements for the next component to be placed in the container. This process is used not only when the user's most recently selected object placement choice is expanded, but at each trial placement created during the depth-first search process required to validate the candidate positions being considered for the next component to be placed. Each of the candidate page layout placements (rectangles that may be valid), as shown in FIGS. 1–5, is generated by the candidate generation process shown in FIG. 7A. Each time the candidate generation process is invoked, it calls a subroutine process for generating "maximal" rectangles, as discussed below and shown in FIG. 7B.

The steps involved in candidate object placement generation in the container are as follows after initially selecting the component (application objects) to be placed on the page layout. They include the following steps:

Step 60. Generate a list of the left, right, top and bottom edges for all components (services applications) placed so far on the page layout, and the four edges delimiting the bounds of the layout area (screen) itself.

Step 61. Generate "maximal" rectangles that do not overlap any services already placed (either by the user or on a trial basis) in the search process up to this point. This step is the subroutine for generating "maximal" rectangles discussed below. This creates an initial set of maximal candidate rectangles where the term "maximal" refers to any non-overlapping (that is, with components already placed) rectangle that cannot be completely contained within any other single non-overlapping rectangle.

Step 62. Delete any rectangles from the list which are too small (that is, those such that none of the preferred minimum sizes associated with the current application service object to be placed can be positioned within them) since they are too small to contain the selected object being placed.

Step 63. Take the "maximal" rectangles remaining and break them into smaller rectangles by using rectangles equal to the various preferred minimum sizes for the current component object to be placed as "cookie cutters" to cut smaller rectangles from the larger ones. In so doing, take into account that any space remaining must, if it is to be useful, be large enough so that at least one of the minimum sizes of one of the remaining component objects can fit within it. If such residual space exists, extend the area originally corresponding to the "cookie cutter" either horizontally, vertically, or in both directions, in order to fill it, so that these useless "leftover" rectangles are eliminated.

Step 64. Delete any of the remaining maximal rectangles from the list which are too small for any of the preferred minimal sizes associated with the component currently being placed to fit within it.

Step 65. Sort the remaining rectangles by size to facilitate the finding of and deleting of duplicates.

Step 66. Delete duplicates from the set of remaining rectangles.

Step 67. Assign ratings to each of the remaining rectangles in accordance with the preselected sizing and positioning preferences for the corresponding component.

Step 68. Sort the rectangles in descending order of the rating assigned in step 67. This sorted order will be the order in which the rectangles will be presented to the user.

Step 69. Return this list of rectangles to the page layout search process.

Maximal Rectangle Generation Subroutine

Figure 7B:
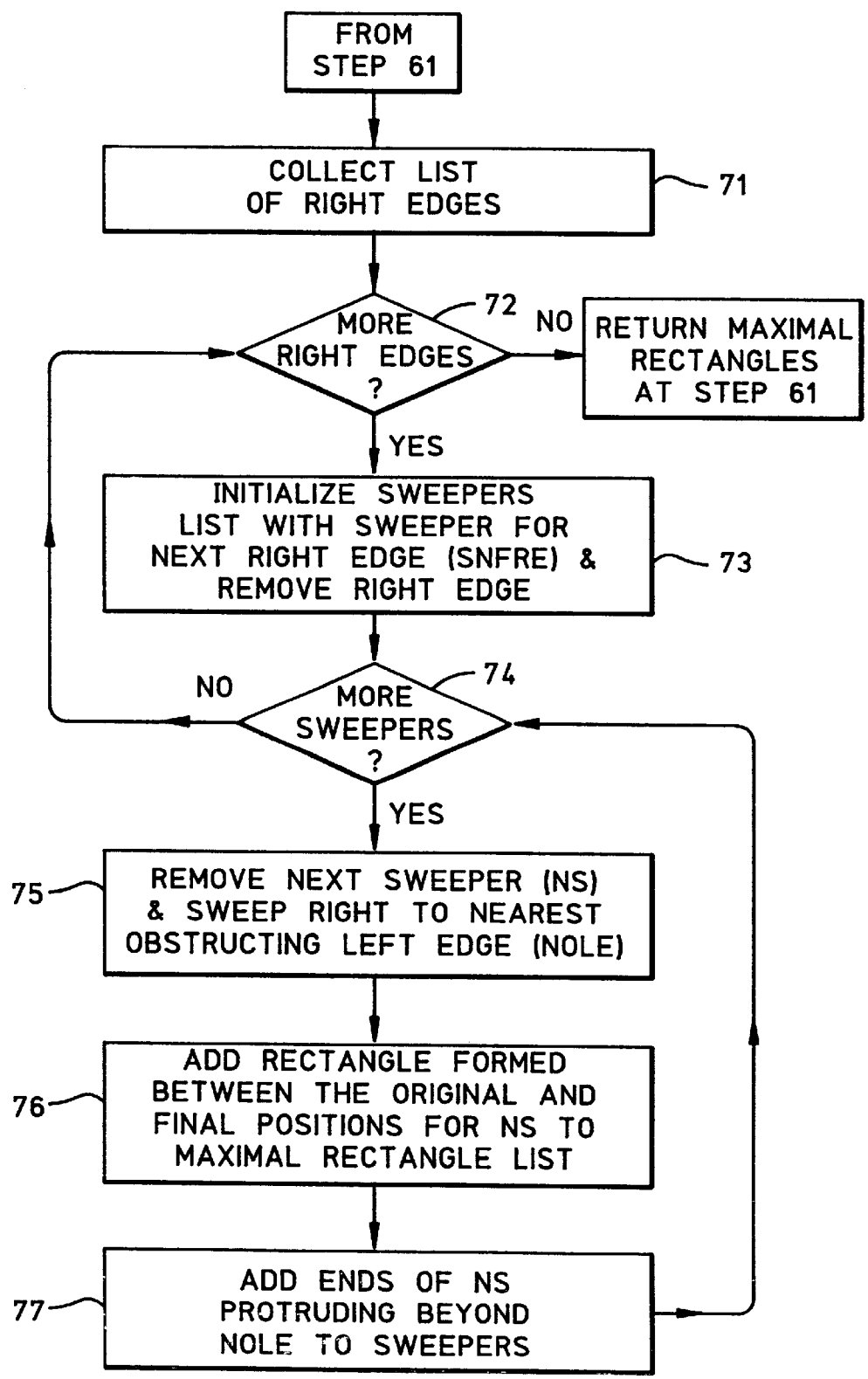
FIG. 7B is a flow diagram showing a subroutine of the placement generator of FIG. 7A.

Referring to FIG. 7B, this subroutine is called from step 61 as discussed above and shown in FIG. 7A. The term "maximal" means any non-overlapping (that is, non-overlapping with placements already made) rectangle that cannot be completely contained within any other single non-overlapping rectangle. The steps involved in the generation of maximal candidate rectangles are as follows:

Step 71. Generate four initial lists of edges (left, right, top and bottom edges) as follows. First, sort the left and right edges generated in step 61 described above from leftmost to rightmost, to assist in finding related edges required by step 74 below. Then sort the top edges from topmost to bottommost, followed by sorting the bottom edges from bottommost to topmost. Initialize a list of maximal rectangles to empty. Then proceed to step 72.

Step 72. Determine whether there are more right edges to be processed. If yes, proceed to step 73. If not, proceed to step 78 that returns the list of maximal rectangles to the calling routine (step 61 above) to be processed in the candidate rectangles routine.

Step 73. Using the next right edge in the list of right edges, create a "Sweeper" For the Next Right Edge (SFNRE) and remove this right edge from the list of sorted right edges determined in step 71. This "sweeper" is a vertical line that includes the edge and extends up until it touches the nearest bottom edge directly above it, and extends down until it touches the nearest top edge directly below it. If a sweeper having the exact coordinates of this one has not already been processed, then add it to a list of sweepers to be processed.

Step 74. Determine if there is at least one sweeper on the sweepers list to be processed, (that is, if there is a next sweeper (NS) on the sweepers list to be processed). If yes, the next sweeper (NS) is processed in step 75. If no, proceed to step 72 to determine whether there are more right edges to be processed.

Step 75. Sweep the next sweeper (NS) line from its starting position to the right until it encounters the Nearest Obstructing Left Edge (NOLE) that obstructs its motion rightward. Remove this next sweeper (NS) from the sweeper list.

Step 76. Add the rectangle whose top is the top of the new sweeper, whose bottom is the bottom of the sweeper, whose right edge is the sweeper itself in its new position, and whose left edge is the sweeper in its original position (the one aligned to the right edge) to the list of maximal rectangles to be output by this subroutine.

Step 77. If the original sweeper extends above the obstructing left edge, create a new sweeper aligned to the obstructing left edge that consists of the part of the original sweeper that extends above the obstructing left edge and add it to the list of sweepers. Also, if the original sweeper extends below the obstructing left edge, create a new sweeper aligned to the obstructing left edge that consists of the part of the original sweeper that extends below the obstructing left edge, and add it to the list of sweepers. Then, continue from step 74.

Method of Use: A "container" is defined as a display window having multiple contained applications. As is well known in the art, this container can be associated with menu bars, optional scrolling view bars and partitioned display areas. Within these latter display areas, there can be text, graphics, multiple applications, and the like. An example of this is Microsoft Windows NT (a trademark of Microsoft Corporation).

Within the container, a plurality of application objects may be embedded, that is, incorporated or contained. As the term is used, an object is defined as an area in a document that contains information or "content," for example, a real time ActiveX object application associated with Microsoft Windows. Programs that manipulate object information are called object editors. Visual representations of objects on a screen or in an electronic document are called data objects. In typical compound document architectures, objects may contain other objects in an embedding hierarchy, where the first object present in a compound document is referred to as the root object. Since the root object is an embedded object, it delineates the content area within which an intrinsic graphical and text content associated with the root object is rendered. To render and manipulate intrinsic data content of the root object, there is associated with the root object a root object editor, also known as a root editing component, representing the underlying program that manipulates object content. Besides the root object, the container is capable of incorporating other objects. Each embedded object, whether or not a root object, delineates a discrete, mutually exclusive content area within the compound document. Content areas are mutually exclusive because each content area only contains one type of data.

In contrast with the root object, which represents the first level of embedding in the container, deeper embedded objects can be represented with a deeper level of embedding. Each embedded object has associated with it an object editor, which is used for rendering and manipulating the content that is intrinsic to that embedded object. In general, each object editor has a proprietary user interface, which is typically furnished by the developer of the application program code underlying that embedded object editor. The user interface represents, among other things, the overall "look" of the content area with which an object editor is associated, the manner in which the content is rendered, as well as the manner in which editing tools are implemented. The portion of the graphical user interface for laying out the editing tools is referred to as a user interface container since its role (be it a menu bar, a floating palette, a dialog box, or the like), is to provide an environment for implementing editing tools.

Figure 8:
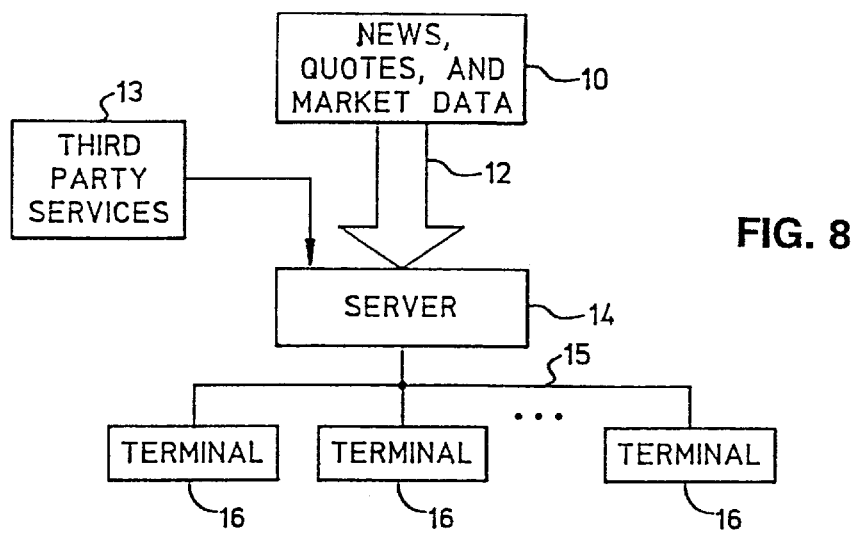
FIG. 8 is a block diagram illustrating an exemplary environment for using the invention.

FIG. 8 illustrates an exemplary and preferred use of the invention, which is part of a system that provides financial data services to subscribers through desktop terminals from commercial financial information databases. The terminals can also display other information received from local connections independent of these commercial databases. Trading information from various exchanges, news services, and private databases typically flows into a national computer center 10 over conventional means (not shown). In the national computer center the information is processed to form a file of transaction and quotation data. Derived files of statistics on individual securities and markets are also maintained. Additional files of data useful to a subscriber are maintained, including dividend, earnings, and forecasting information for a variety of financial instruments, stocks and bonds.

Figure 9:
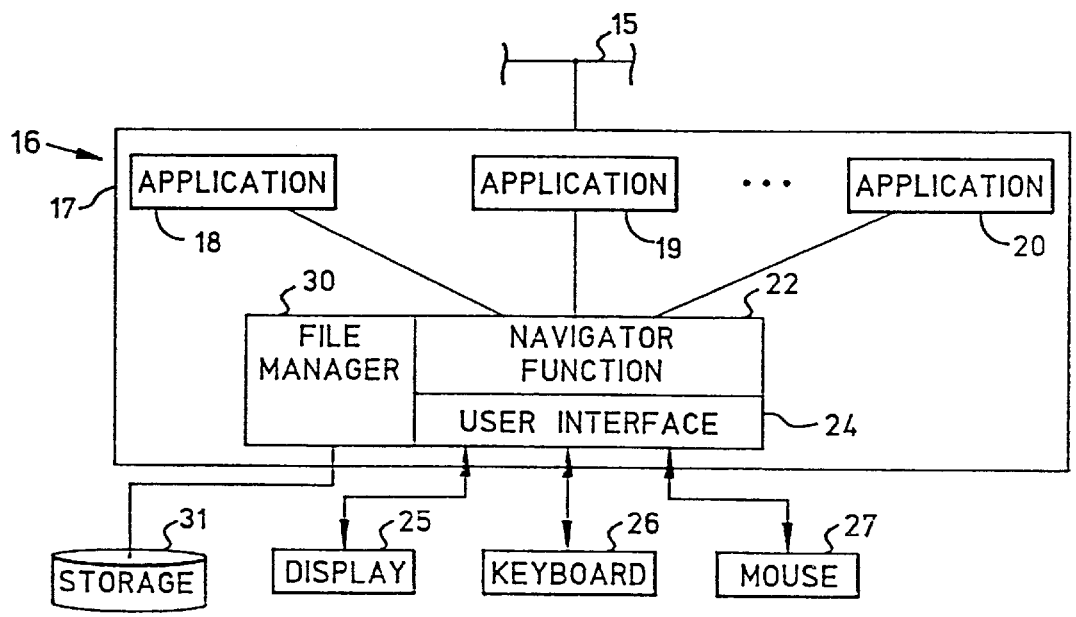
FIG. 9 is a block diagram illustrating a terminal as used in FIG. 8.

The national computer center 10 is connected through an information transmission structure 12 including transmission lines, regional data centers, and concentrator sites (all not specifically shown). Other services, independent of the financial data, are provided from third party services 13 by conventional means of data transmission. At a typical subscriber's site, a subscriber server 14, which can be multiple servers collectively shown as the server 14, is connected to the information transfer structure 12 and third party services 13 and through a local area network 15 (or the Internet) to a plurality of branch terminals 16. Three are shown but there could be any practical number. Preferably, the server 14 is a SUN or UNIX-based machine executing either NT or UNIX operating systems with an appropriate application program interface (API) and the terminals have a Microsoft Windows-based operating system in personal computers (PC) which run a commercially-available user interface such as the Microsoft Windows NT system. The architecture of a branch terminal such as a terminal 16 is shown in FIG. 9. SUN and UNIX are trademarks of their respective corporate entities.

Referring to FIG. 9, the terminal 16 typically includes a commercially-available PC 17, which is capable of supporting concurrent execution of a plurality of application programs 18, 19, and 20. FIG. 9 indicates that there could be any number of application programs. The application programs 18–20 are interfaced through a navigator function 22 that is joined conventionally to a graphical user interface 24. The graphical user interface is a software system which allows a user to directly manipulate the application programs 18, 19, and 20 by means of conventional I/O devices such as a CRT display 25, a keyboard 26, or a mouse 27, or other user specified device, or all of them if desired. A file manager 30 is also provided which opens, maintains, and closes files on behalf of the navigator function 22 and the graphical user interface 24. The file manager 30 operates in conjunction with one or more peripheral storage devices such as a direct access storage device (hard disk drive) 31.

The graphical user interface 24 operates conventionally as a windowing system such as that described in Chapter 13 of V. J. Mayhew's PRINCIPLES AND GUIDELINES IN SOFTWARE USER INTERFACE DESIGN (USA: Prentiss-Hall, 1992), pp. 437–457. Graphical user interfaces, or "GUIs" as they are often designated, have become a popular feature of computers, especially personal computers (PC). One of the many advantages of such GUIs is that they provide a quick and easy platform to display frequently used or required data by selecting and manipulating graphical display elements, such as icons, with a pointing device, such as a mouse. The icons of a GUI are designed to behave in a manner similar to the objects they represent. A GUI/operating system of the preferred embodiment reside within a computer-readable media that allows one or more users to initiate the manipulation of displayed object icons and text on a device. Any suitable computer-readable media may retain the GUI and operating system. The Apple MacIntosh operating system, Microsoft Windows 98 or NT operating system, and UTNIX X-Windows are common and very popular examples of GUIs, illustrating the fact that the advantages of GUIs over conventional text-based user interfaces are widely recognized. As a result of most PC using GUIs, a variety of different means for organizing and navigating through various applications have been developed. The operational capability of a user interface of the windowing system type is fundamental to, but distinct from, the invention. The GUI 24 includes conventional ways for initiating and managing application program execution and for initiating, managing, activating, and deactivating application windows on the display 25. Apple and Macintosh are trademarks of Apple Corporation.

Referring to FIG. 9, the GUI 24 of the present invention is shown in connection with graphical display and control of executing multiple active applications, and in particular, financial service applications. In the preferred embodiment of the navigator function 22, the Reuters Plus (a trademark of Reuters Corporation) financial service navigator is used on a platform operating system with GUI capability, preferably Microsoft Windows 98 or NT GUI. The navigator function 22 and interface 24 manage and control the contents of the "container" having multiple active applications. Although the preferred embodiment of the invention has a user interface 24 based on Microsoft Windows operating system, the container can be implemented in any number of different GUI operating systems.

The navigator function application 22 is a software program written in the well-known C++ language and is compilable and executable on a PC processor such as the processor 17. The navigator application function 22 can include macro-instructions called a keystroke or mouse "hook" which interfaces the navigator function 22 with the keyboard 26 or preferably uses a mouse 27 or other user defined input (for example, voice recognition). This function can be understood with reference to the Programmer's Reference: Functions, published by Microsoft Corporation (1987–1998) for the Microsoft Windows operating system. As an example of a user interface input control, either a keystroke or mouse control hook function intercepts all input keys or mouse actions and passes them to a keyboard hook or mouse processing routine in the navigator function 22 for processing before they are passed to the applications. An exemplary form for a navigator uses the keystroke hook function that enables the navigator function 22 to detect user specified actions in response to which the navigator function invokes certain actions. The keystroke hook function is discussed in detail in commonly assigned U.S. Pat. No. 5,721,850 entitled, "Method and means for navigating user interfaces which support a plurality of executing applications." The preferred navigator function 22 is the container that encompasses multiple applications using Microsoft ActiveX/OCX "object" technology for implementing these application objects. It is understood, however, that application objects can be from any application that meets the API specifications of the GUI.

Moreover, the method of the invention can be implemented as an "applet" for use with JAVA (a trademark of Sun Corporation) programming language developed by Sun Microsystems, Inc. in Mountain View, Calif. The standard HTML syntax of Web pages and the standard communications protocol (HTTP) supported by the WWW guarantee that any Web browser can communicate with any Web server. JAVA programming language provides architecture independence of programs written in the JAVA language that allows a user to assemble programs from components that are distributed on diverse Internet nodes or to download entire program folders from other Internet nodes and use applets as required.

The terminals 16 can include a market quote application which is a container for displaying multiple service applications (objects). In the preferred embodiment of the navigator function 22, the Reuters Plus financial service navigator 22 is used on a platform operating system with GUI capability, preferably a Microsoft Windows 98 or NT GUI. These multiple financial service application objects are ActiveX object designs using the API of Microsoft Windows operating system, which are linked to databases over the LAN 15. These objects can include multiple financial information services from sources such as Dow Jones News, EDGAR SEC Filings and the like and Internet Web sites such as Yahoo (EDGAR and Yahoo are trademarks of the Securities Exchange Commission and Yahoo, Inc.). These applications are listed in the application table of the navigator function 22. Other services available from third parties may be provided to the terminals either through the system structure 10, 12 of FIG. 8 or by the third party services 13. These third party services are supported by third party applications, such as the application 20, that co-executes with the navigator function 22 in a terminal. Third party programs may include, for example, the Microsoft WORD and EXCEL programs (WORD and EXCEL are trademarks of Microsoft Corporation). The navigator function 22 also maintains a system configuration file. The system file is maintained for the purpose of establishing a set of window characteristics definitive of a set of system windows and is used as a point of reference in navigating through window configurations. In addition, each application (including the navigator function) maintains its own window configuration buffer which is used, when the application executes, to keep the current parameter values definitive of the current configuration of the application's window. Such buffers include window configuration buffers and are maintained in real memory. Various methods and apparatus currently exist for allowing a GUI to support many different applications. Furthermore, portions of data, or objects, can be shared between the different applications. For example, the third party services as illustrated in FIG. 8 can be applications that interface with other applications such as a Microsoft EXCEL spreadsheet application as well as word processing application such as Microsoft WORD. Using Microsoft Windows, a selection of spreadsheet cells of a Microsoft EXCEL spreadsheet can be placed inside a WORD document. In this example, the EXCEL spreadsheet is an "object server" document, the selection of spreadsheet cells is an "object," and the WORD document is an "object container" document. The WORD container document is a conventional document, except that it provides a "client" window for the object. As a result, the object is either linked or embedded into the container. When an object is linked from the server document to the container document, a user may edit the object by making changes to the server document. When the object is embedded from the server document to the container document, the user may edit the object inside the container document by accessing features of the server document's application.

Figure 10:
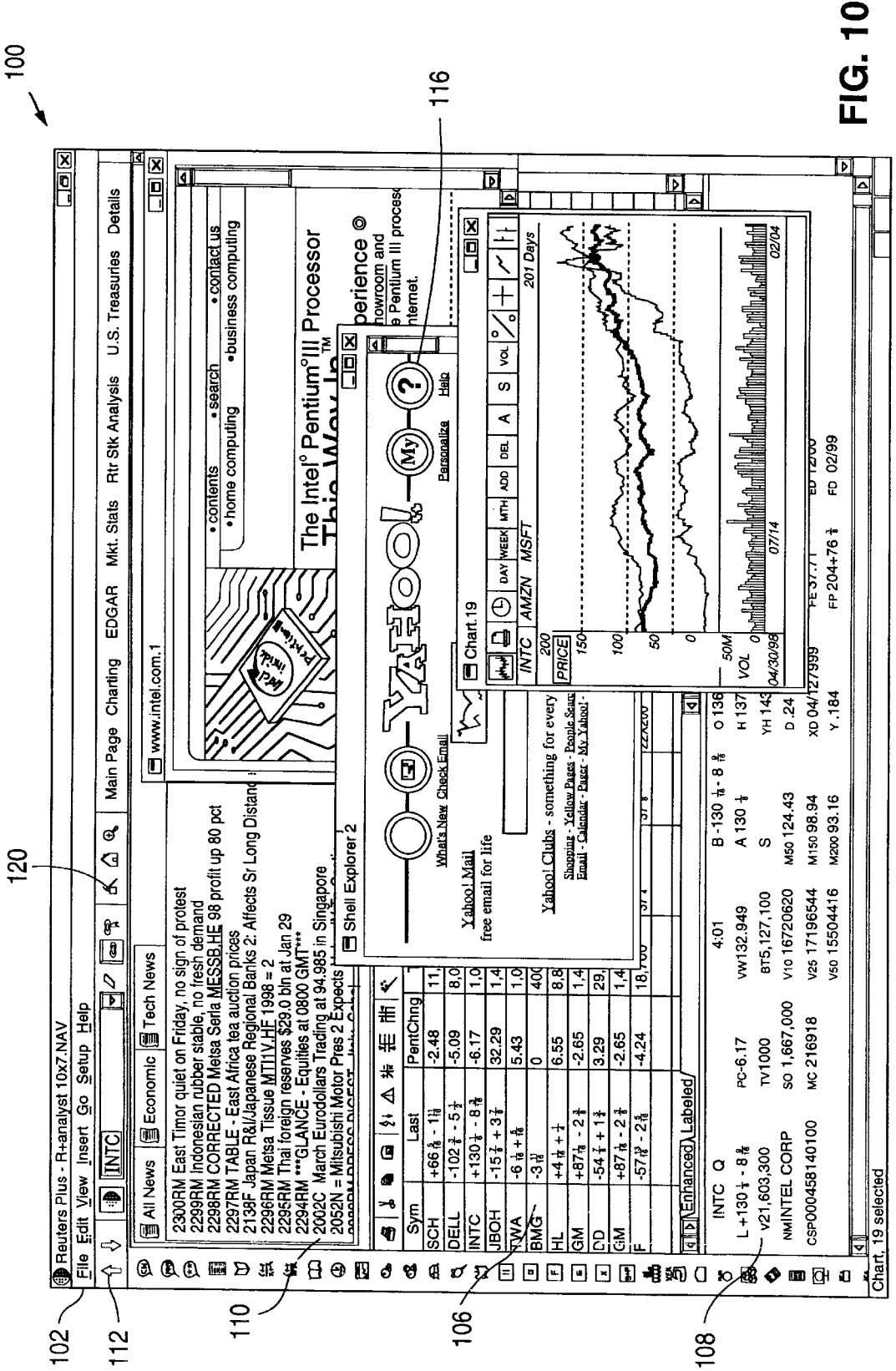
FIG. 10 shows an exemplary container application for using the invention in financial market quote application as shown in FIG. 9.

Referring to FIG. 10, a financial service navigator application window 100 is shown, and in particular, the Reuters Plus (a trademark of Reuters America.) application made by Reuters America Inc., New York, N.Y. This application provides current market quote data to financial service professionals. This window typically could appear on a terminal display 25. The navigator window 100 includes a menu bar 102, an application object execution button bar 104, and a display areas of multiple financial application objects 106, 108, and 110 on a display screen. Exemplary application objects 106, 108 and 110 contain research, market data news fundamentals and analytics in one window. An Internet Web browser 116 can be incorporated in the container as one of the application objects and shown in part of the display as the Yahoo Web display object 108 as shown. Each of the buttons in the bar 104 represents particular object window viewing for a selected financial service application. Adjacent the top of the application object display are button tabs 112 for control of the container, each of which identifies a functionality such as printing, searching services and the like within an one of application object programs. In exemplary form, the invention page layout method can be executed by activation of the tab 120 by clicking thereon by action motions of a mouse or other user specified input device.

The service application objects 106, 108 and 1 0 are controllable objects using the Microsoft NT OCX container-type programming. These applications include a Web browser capability with an array of third-party information sources, combined with real-time news and market quote data package that reflect several segments of the US equity market. This application allows a user to integrate their own proprietary functions with Reuters Plus application. By combining market data and third party information providers with a customer's intranet and the Internet, a user can access all this information simultaneous on a single screen. A number of different third-party providers include: fundamental data on US stocks from Market Guide, mutual fund data from CDA/Wiesenberger, CDA/Spectrum institutional holdings data, earnings estimate data from IBES and Disclosure's EDGAR service. Other features of the Reuters Plus application can include 32-bit-type container applications that support client and third party applications such as Microsoft EXCEL spread sheet application and WORD word processor application, Reuters News and Dow Jones News Service commingled and searchable with Reuters news Internet browser included in the Reuters Plus application to allow seamless integration of company intranet and Internet information with market quote data.

The Reuters Plus application containing financial market quote data provides personalized page layouts created by the user by creating unique pages for tracking different markets or portfolios. These customized page layout displays consist of any combination of service application objects. Using the invention allows generation of multiple unique customized windows, each consisting of selected service application objects from a master list of applications that include financial news headlines, ticker, chart, dynamic time & sales, monitor list and quote data. Each page layout generated is assigned a name that subsequently appears as a button in the activation bar 104. To initiate execution of the page layout method, a user clicks on the control button 120. The sequence of user assist windows in the Reuters Plus application for using the invention is shown in FIGS. 11–13.

Figure 11:
FIG. 11 shows an editing control page for the page layout method of the financial application shown in FIG. 10.

Initially, a user selects the service objects desired to be presented in the page layout as shown in FIG. 11 in the window 130. These services, as shown, are Chart-History, Monitor and Quote-Consolidated. Using a mouse, the user typically selects these services by pointing and clicking on them accordingly. The number to the left of these services represents the number of times the object is placed on the page layout window for that service object.

Figure 12:
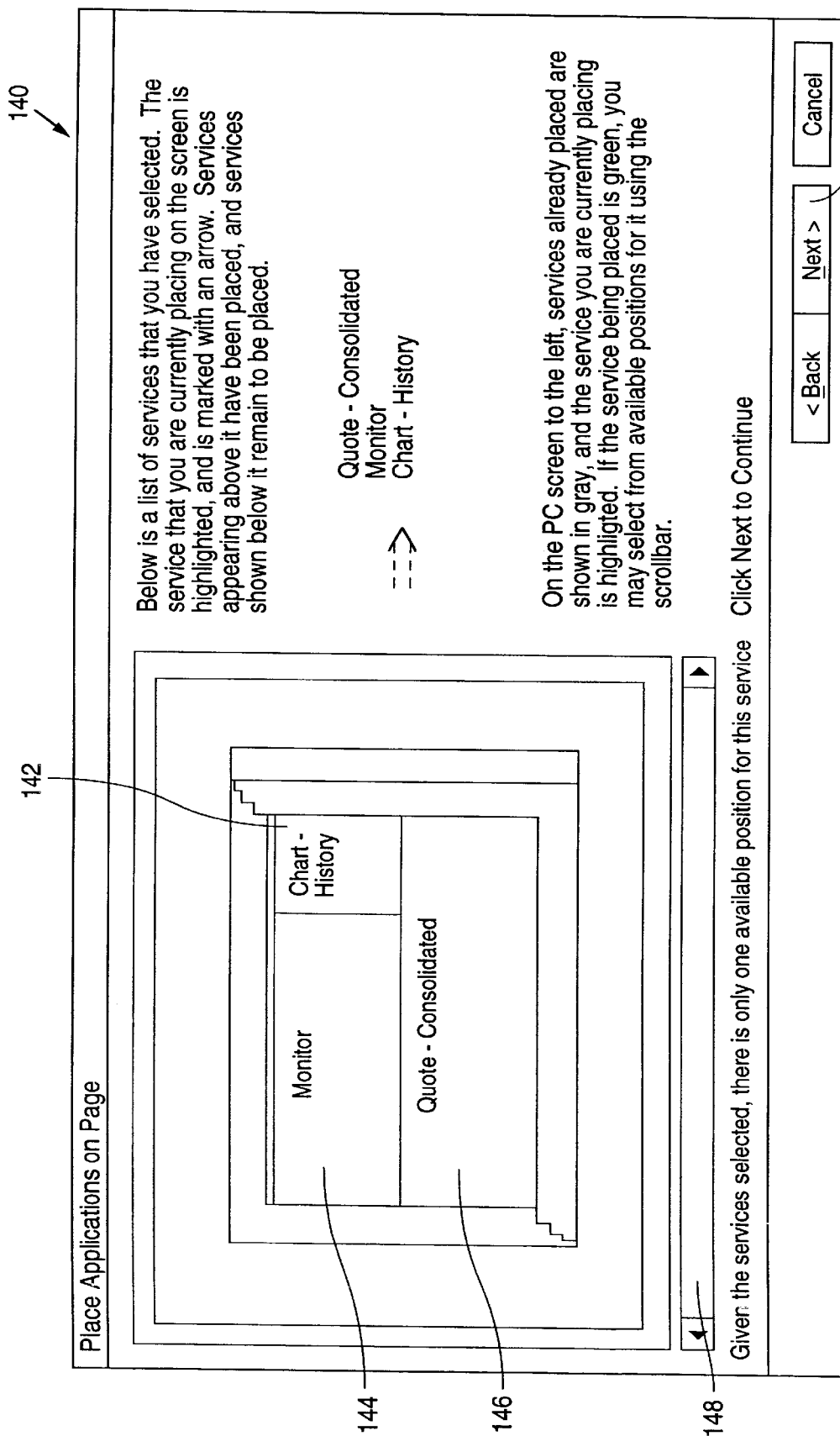
FIG. 12 shows an editing control page following that shown in FIG. 11.
Figure 13:
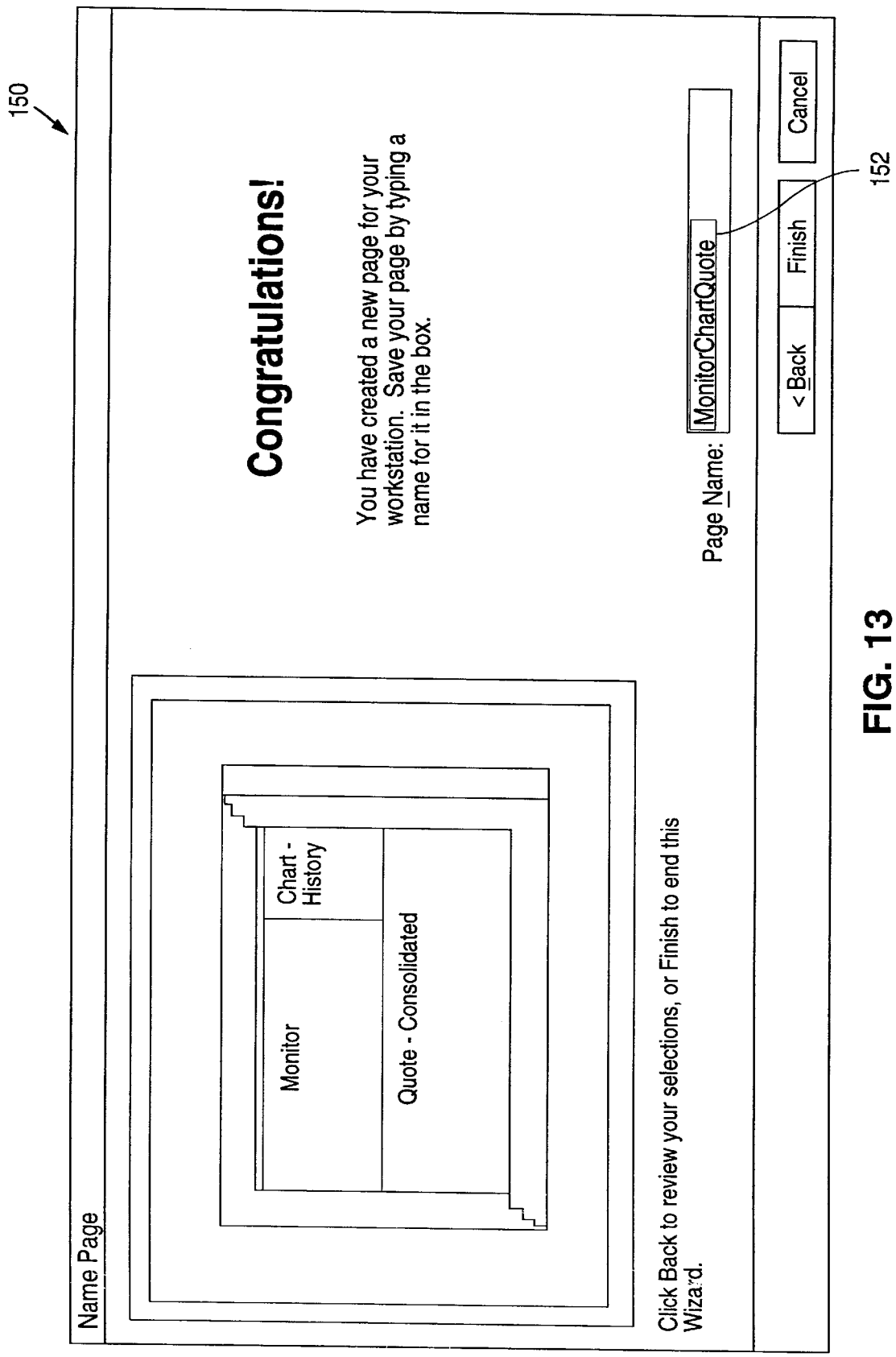
FIG. 13 shows an editing control page following that shown in FIG. 12 at completion.

Then the user validates the placement of these service objects in the positions by confirming sequentially their choice as shown in FIG. 12 in the window 140. The invention optimizes the space used by each service application, so no screen space is unused. The simulated PC screen to the left shows the placements of all components thus far (144 and 146), with the component object 142 to be placed being highlighted. In the window shown, all components have been placed except for the last service. If the screen showed an earlier state where fewer components had been placed, then the scroll bar 148 below the simulated PC screen can be used to move the component object to be placed through each permissible candidate location. This corresponds to possible page layout solution candidates. If a user is not satisfied with the page layout, the user can go back and restart the page layout method for another possible page layout selection. When the current object being placed is validated, the user selects the "Next" button 149 at the bottom of the display. Finally, in the last window display 150 as shown in FIG. 13, a page name is assigned to the newly created page layout window. The user can subsequently open this page layout with a click on the page name button in the button execution bar 104 by a user specified input device such as a mouse, an assigned hotkey usage and executing this assigned named page 152 accordingly.

Although the invention has described "component objects" in a preferred use for implementing screen display of application objects within a container application using a computer system, an object can be any distinct rectangular object (or defining a rectangular object framing a non-orthogonal object such as a circular object within a rectangle). Other applications of the invention can include display multiple distinct graphical objects as used in desktop publishing or print-type applications.

While several preferred embodiments of the page layout function have been described, it should be evident that modifications and adaptations thereof will occur to persons skilled in the art. Therefore, the protection afforded the invention should only be limited in accordance with the spirit and scope of the following claims and their equivalents.

What is claimed is:

1. In a computer system having a container with a display area that includes at least two objects from a set of multiple objects, the system including a digital data processor, a display coupled to the processor, and a user interlace coupled to the processor, a method for user-defined page layout for output display of the display area comprising the steps of:

a) selecting objects from a set including the multiple objects;

b) generating candidate placements for the "next selected object to be placed" using the computer system by:

generating a first set of candidate placements for the "next selected object to be placed," thereby creating a breadth-first expansion of a current search state representing all objects whose placements have been validated; then generating a second set of candidate pages layouts that is a subset of the first set by using a "depth-first search process" starting from each object in the first set that determines if the remaining selected objects can be placed in unused areas of the container consistent with criteria that: i) no selected objects overlap; ii) the entire area within each container is occupied by the selected objects; and iii) size constraints of each selected object are satisfied, and eliminating any candidate placement that does not lead to a complete layout that satisfies these criteria;

c) allowing selection by a user of the "next object to be placed" from the second set of candidate page layouts; and d) repeating step b) and step c) for as long as there is another selected object to be planed in the page layout.

2. The method of claim 1, wherein step a) further includes sorting of the selected objects by a user specified criteria.

3. The method of claim 1, wherein for step b), if any of the candidates in the first set have an area that is not large enough for any of the required minimum sizes of the next object to be placed, then that candidate is eliminated from the set.

4. The method of claim 1, wherein for step c), a user interface is provided for enabling a simulated display of the candidate page layout showing placement of the "next object to be placed" from the second set of candidate page layouts for user selection.

5. The method of claim 4, wherein the providing of the user interface includes a window for displaying an identifier for a component being placed.

6. The method of claim 1, wherein the generating of candidate placements for the "next selected object to be placed " of step b) comprises:

i) generating a list of left, right, top and bottom edges of the selected objects that have been placed and the edges delimiting the bounds of the container in the page layout;

ii) generating a list of maximal rectangles that do not overlap the "selected objects that have been placed" using a subroutine for generating the list of maximal rectangles;

iii) deleting any rectangles from the list of maximal rectangles that are smaller than any of the required minimum sizes of the next object to be placed;

iv) adding more rectangles to the list of maximal rectangles only when one or more of the minimum sizes of the next object to be placed can fit within any of the rectangles in the list of maximal rectangles with room to spare;

v) deleting any remaining rectangles from the list of maximal rectangles that are smaller than the required minimal size of any of the next object to be placed;

vi) deleting any duplicate rectangles in the list of maximal rectangles; and vii) assigning a rating to each of the rectangles in the list of maximal rectangles according to a sizing preference for that selected object, and sorting the list of maximal rectangles based upon this rating, and generating a final list of maximal rectangles.

7. The method of claim 6, wherein step ii) of generating the list of maximal rectangles subroutine comprises:

aa) generating lists of edges by sorting the left and right edges generated in step i) from leftmost to rightmost and sorting the top edges from topmost to bottommost, followed by sorting the bottom edges from bottommost to topmost and creating a list of sorted right edges;

bb) generating a "sweepers" list, if there are more right edges to process in the list of sorted right edges, such that the sweepers list includes a "sweeper" for a next right edge (SFNRE) such that this next right edge is removed from the list of sorted right edges, thereby creating a candidate "sweeper" that is a vertical line that includes the removed right edge and extends upward until it touches the nearest bottom edge directly above it, and extends downward until it touches the nearest top edge directly below it, and if no other sweeper has already been generated that has the exact coordinates of the one being generated, then it is added to the sweepers list, and if there are no more of the right edges to process, then step ii) of using the subroutine for generating the list of maximal rectangles is complete, and the list of maximal rectangles that has been generated is returned;

cc) determining if there is a next sweeper (NS) on the sweepers list to process and if there are none, go to step bb);

dd) generating a rectangle formed by the area encompassed by a sweeper from the sweepers list in the course of sweeping the next sweeper (NS) line from the starting position of the NS, to the right until the NS encounters the nearest left obstructing edge (NOLE) in the container, then deleting the next sweeper (NS) line from the sweeper list;

ee) adding the formed rectangle generated during step dd) to the list of maximal rectangles; and ff) if the NS protrudes either above or below the NOLE, adding to the sweeper list at least one new sweeper for each such protrusion beyond the NOLE and repeating step cc) through this step.

8. A method for configuring a page layout display for a navigator-type container application for use in an interactive computer system with a keyboard, a video display, and a user interface, means for supporting execution of multiple application objects in the container application, and means for configuring the multiple application objects displayed in the container application on the video display, the method comprising:

a) selecting application objects from a set including the multiple application objects;

b) generating candidate placements for the "next selected application object to be placed" using the computer system by:

generating a first set of candidate placements for the "next selected object to be placed," thereby creating a breadth-first expansion of a current search state representing all application objects whose placements have been validated; then generating a second set of candidate pages layouts that is a subset of the first set by using a "depth-first search process" starting from each application object in the first set that determines if the remaining selected application objects can be placed in unused areas of the container application consistent with criteria that: i) no selected application objects overlap; ii) the entire area within the container application is occupied by the selected objects; and iii) size constraints of each selected application object are satisfied, and eliminating any candidate placement that does not lead to a complete layout that satisfies these criteria;

c) allowing selection by a user of the "next object to be placed" from the second set of candidate page layouts; and d) repeating step b) and step c) for as long as there is another selected application object to be placed in the page layout.

9. The method of claim 8, wherein the providing of a computer system having a container application that comprises a financial information service application and the multiple application objects comprise real-time market quote data from multiple sources.

10. The method of claim 8, wherein the providing of the computer system with the user interface, and the means for configuring the multiple application objects further includes means for enabling simulation of a display of the candidate page layout showing placement of the "next application object to be placed" from the second set of candidate page layouts.

11. The method of claim 10, wherein the providing of the user interface includes a window for displaying an identifier for a component application object being placed.

12. A computer system comprising:

a video screen;

a user interface; and a digital data processor coupled to the video screen and user interface, the processor having programming means for controlling page layout of a container application having multiple application objects, the programming means including instructions for:
  a) selecting application objects from a set including the multiple application objects;
  b) generating candidate placements for the "next selected application object to be placed" using the computer system by:
    generating a first set of candidate placements for the "next selected object to be placed." thereby creating a breadth-first expansion of a current search state representing all application objects whose placements have been validated; then
    generating a second set of candidate pages layouts that is a subset of the first set by using a "depth-first search process" starting from each application object in the first set that determines if the remaining selected application objects can be placed in unused areas of the container application consistent with criteria that: i) no selected application objects overlap; ii) the entire area within the container application is occupied by the selected objects; and iii) size constraints of each selected application object are satisfied, and eliminating any candidate placement that does not lead to a complete layout that satisfies these criteria;
  c) allowing selection by a user of the "next object t4 be placed" from the second set of candidate page layouts; and
  d) repeating step b) and step c) for as long as there is another selected application object to be placed in the page layout.

13. The system of claim 12, wherein the container application comprises a financial information service application and the multiple object applications comprise real-time market quote data from multiple sources.

14. The system of claim 12, wherein the programming means for controlling page layout of the container application further includes means for enabling simulation of a display of the candidate page layout showing selection and placement of the "next application object to be placed" from the second set of candidate page layouts.

15. The system of claim 12, wherein the programming means for controlling page layout of a container application includes a display window with, means for assigning an identifier to the selected page layout that can be opened and controlled by the user interface.

16. The system of claim 12, wherein the computer system comprises a local area network (LAN) coupled to a terminal that encompasses the digital data processor, the LAN attaches to a service provider.

17. The system of claim 16, wherein the service provider includes multiple financial data bases that provide real-time financial market quote data.

18. The system of claim 17, wherein the container application comprises a navigator financial information service container application and the multiple object applications comprise real-time market quote data transmitted from the service provider.

19. The system of claim 18, wherein third party applications are incorporated with the container application.

20. The system of claim 12, wherein instruction b) of the programming means comprises:
  i) generating a list of left, right, top and bottom edges of the selected objects that have been placed and the edges delimiting the bounds of the container in the page layout;
  ii) generating a list of maximal rectangles that do not overlap the "selected objects that have been placed" using a subroutine for generating the list of maximal rectangles;
  iii) deleting any rectangles from the list of maximal rectangles that are smaller than any of the required minimum sizes of the next object to be placed;
  iv) adding more rectangles to the list of maximal rectangles only when one or more of the minimum sizes of the next object to be placed can fit within any of the rectangles in the list of maximal rectangles with room to spare;
  v) deleting any remaining rectangles from the list of maximal rectangles that are smaller than the required minimal size of any of the next object to be placed;
  vi) deleting any duplicate rectangles in the list of maximal rectangles; and
  vii) assigning a rating to each of the rectangles in the list of maximal rectangles according to a sizing preference for that selected object, and sorting the list of maximal rectangles based upon this rating, and generating a final list of maximal rectangles.

* * * * *